(12) United States Patent
Hitchcock

(10) Patent No.: US 6,236,390 B1
(45) Date of Patent: May 22, 2001

(54) METHODS AND APPARATUS FOR POSITIONING DISPLAYED CHARACTERS

(75) Inventor: Gregory C. Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/273,105

(22) Filed: Mar. 19, 1999

Related U.S. Application Data

(63) Continuation-in-part of application No. 09/168,013, filed on Oct. 7, 1998, and a continuation-in-part of application No. 09/191,181, filed on Nov. 13, 1998.

(51) Int. Cl.⁷ .................................................. G06F 17/30
(52) U.S. Cl. .......................... 345/149; 345/114; 345/144; 707/528
(58) Field of Search .................................. 345/149, 144, 345/114, 472, 948, 116, 138, 132, 113; 382/298; 358/451; 707/528

(56) References Cited

U.S. PATENT DOCUMENTS

| | | | |
|---|---|---|---|
| 4,136,359 | 1/1979 | Wozniak | 358/17 |
| 4,217,604 | 8/1980 | Wozniak | 358/16 |
| 4,278,972 | 7/1981 | Wozniak | 340/703 |
| 4,703,318 * | 10/1987 | Haggerty | 345/114 |
| 4,851,825 * | 7/1989 | Naiman | 345/132 |
| 5,057,739 | 10/1991 | Shimada et al. | 313/477 R |
| 5,113,455 * | 5/1992 | Scott | 382/298 |
| 5,122,783 | 6/1992 | Bassetti, Jr. | 340/701 |
| 5,153,577 * | 10/1992 | Mackey et al. | 345/149 |
| 5,254,982 | 10/1993 | Feigenblatt et al. | 345/148 |
| 5,298,915 | 3/1994 | Bassetti, Jr. et al. | 345/149 |
| 5,334,996 | 8/1994 | Tanigaki et al. | 345/152 |
| 5,341,153 | 8/1994 | Benzschawel et al. | 345/152 |
| 5,349,451 | 9/1994 | Dethardt | 358/518 |
| 5,404,432 * | 4/1995 | Koopman et al. | 707/528 |
| 5,444,460 * | 8/1995 | Fujitaka et al. | 345/144 |
| 5,467,102 | 11/1995 | Kuno et al. | 345/1 |
| 5,543,819 | 8/1996 | Farwell et al. | 345/150 |
| 5,548,305 | 8/1996 | Rupel | 345/150 |
| 5,555,360 | 9/1996 | Kumazaki et al. | 395/143 |
| 5,623,593 * | 4/1997 | Spells, III | 345/472 |
| 5,633,654 | 5/1997 | Kennedy, Jr. et al. | 345/114 |
| 5,689,283 | 11/1997 | Shirochi | 345/132 |
| 5,767,837 | 6/1998 | Hara | 345/152 |
| 5,821,913 | 10/1998 | Mamiya | 345/88 |
| 5,847,698 | 12/1998 | Reavey et al. | 345/173 |
| 5,894,300 | 4/1999 | Takizawa | 345/115 |
| 5,949,643 | 9/1999 | Batio | 361/681 |
| 5,963,185 | 10/1999 | Havel | 345/83 |

\* cited by examiner

*Primary Examiner*—Mark R. Powell
*Assistant Examiner*—Thu-Thao Havan
(74) *Attorney, Agent, or Firm*—Workman, Nydegger, Seeley

(57) ABSTRACT

Methods and apparatus for rendering and/or displaying images such as text using sub-pixel accuracy are described. In various embodiments, character advance width is determined using pixel precision while left side bearing and/or black body width is determined using sub-pixel precision. Such embodiments provide for characters with overall widths corresponding to pixel widths but with the character black bodies being positioned within the overall character space to a higher degree of position than when pixel precision is used. In other embodiments, sub-pixel precision is used for determining a character's overall width as well as left side bearing and black body width values. In such embodiments, black body starting points and left side bearing points are aligned with sub-pixel component boundaries. By treating R, G, B pixel element sub-components as independent luminous intensity sources and by using pixel sub-component accuracy for character width, spacing and positioning, overall image appearance is enhanced as compared to embodiments which use pixel precision for character width, spacing and positioning values.

34 Claims, 11 Drawing Sheets

METHODS AND APPARATUS FOR POSITIONING DISPLAYED CHARACTERS

RELATED APPLICATIONS

This application is a continuation-in-part of pending patent application Ser. No. 09/168,013 which was filed on Oct. 7, 1998 and a continuation-in-part of pending patent application Ser. No. 09/191,181 which was filed on Nov. 13, 1998 both of which are hereby expressly incorporated by reference.

FIELD OF THE INVENTION

The present invention relates to methods and apparatus for displaying images and, more particularly, to methods and apparatus for controlling the spacing and/or positioning of images such as displayed text characters.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by the human eye.

In cathode ray tube (CRT) display devices, the different colors of light are generated with phosphor coatings which may be applied as dots in a sequence on the screen of the CRT. A different phosphor coating is normally used to generate each of three colors, red, green, and blue. The coating results in repeated sequences of phosphor dots each of which, when excited by a beam of electrons, will generate the color red, green or blue.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted from the additive primary colors, red, green, and blue, can be varied to get the appearance of almost any desired color pixel. Adding no color, i.e., emitting no light, produces a black pixel. Adding 100 percent of all three colors results in a white pixel.

Portable computing devices, including hand held devices and portable computers, often use liquid crystal displays (LCD) or other flat panel display devices 102, as opposed to CRT displays. This is because flat panel displays tend to be smaller and lighter than CRT displays. In addition, flat panel displays are well suited for battery powered applications since they typically consume less power than comparable sized CRT displays.

Color LCD displays are examples of display devices which utilize multiple distinctly addressable elements, referred to herein as pixel sub-components or pixel sub-elements, to represent each pixel of an image being displayed. Normally, each pixel element of a color LCD display comprises three non-square elements, i.e., red, green and blue (RGB) pixel sub-components. Thus, a set of RGB pixel sub-components together define a single pixel element.

Known LCD displays generally comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB vertical stripes.

FIG. 1 illustrates a known LCD screen 200 comprising a plurality of rows (R1–R12) and columns (C1–C16). Each row/column intersection defines a square which represents one pixel element. FIG. 2 illustrates the upper left hand portion of the known display 200 in greater detail.

Note in FIG. 2 how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width full height, pixel sub-components 206, 207, 208 form a single pixel element.

As illustrated in FIG. 1, one known arrangement of RGB pixel sub-components 206, 207, 208 form what appear to be vertical color stripes on the display 200. Accordingly, the arrangement of ⅓ width color sub-components 206, 207, 208, in the known manner illustrated in FIGS. 1 and 2, is sometimes called "vertical striping".

Traditionally, each set of pixel sub-components defining a pixel element is treated as a single pixel unit. The intensity of each pixel sub-component is controlled by a luminous intensity value. Accordingly, in known systems luminous intensity values for all the pixel sub-components of a pixel element are generated from the same portion of an image. Consider for example, the image segmented by the grid 220 illustrated in FIG. 3. In FIG. 3 each square of the grid represents an area of an image which is to be represented by a single pixel element, e.g., a red, green and blue pixel sub-component of the corresponding square of the grid 230. In FIG. 3 a cross-hatched circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in known systems, the RGB pixel sub-components are generally used as a group to generate a single colored pixel corresponding to a single sample of the image to be represented.

Text characters are an example of images which are frequently displayed by a computer system. Spacing between characters, and the position of a character within a fixed amount of space allocated to a character, can significantly impact the perceived quality of text. In addition, character spacing is important from a document formatting perspective.

Many modern computer systems use font outline technology, e.g., scalable fonts, to support the rendering and display of text. In such systems each font, e.g., TinesNewRoman, Onyx, Courier New, etc. is supported by using a different font set. The font set normally includes a high resolution outline representation, e.g., lines points and curves, for each character which may be displayed using the font. The stored outline character representation normally does not include white space beyond the minimum and maximum horizontal and vertical boundaries of the character as to not take up extra space. Therefore, the stored character outline portion of a character font is often referred to as a black body (BB). In addition to BB information, a character font normally includes BB size, BB positioning, and overall character width information. BB size information is sometimes expressed in terms of the dimensions of a bounding box used to define the vertical and horizontal borders of the BB.

FIG. 4 illustrates a character, the letter A 400. Box 408 is a bounding box which defines the size of the BB 407 of the character 400. The total width of the character 400, including optional white space to be associated with the character 400, is specified by an advanced width (AW) value 402. Point 404 is referred to as the left side bearing point (LSBP). The LSBP 404 marks the horizontal starting point for positioning the character 400 relative to a current display position. Point 406 is the right side bearing point (RSBP). The RSBP 406 marks the end of the current character and the point at which the LSBP 404 of the next character should be positioned. The horizontal distance located between the left side bearing point 404 and the start of the BB 407 is called the left side bearing (LSB) 410. LSB values can be specified as either positive or negative values. The horizontal distance 412 located between the end of the BB 407 and the RSBP 406 is called the right side bearing (RSB). The RSB 412 indicates the amount of white space to be placed between the BB 407 of a current character and the LSB of 404 of the next character. Thus, the RSB 412 corresponds to the amount of white space that should be located to the right of a character's BB 407.

As discussed above, a scalable font file normally includes BB size, BB positioning, and overall character width information for each supported character. The BB size information may include horizontal and vertical size information expressed as bounding box dimensions. The BB positioning information may include, e.g., the LSB value 410. Overall character width information may be included in a character's font as an AW 402.

Most computer systems force the starting and ending points, e.g., the LSBPs and RSBPs, respectively, of characters which are being displayed to be positioned on pixel boundaries. In addition, they usually force the BB width and LSB to be an integer multiple of the pixel size. In known implementations, this is done by first scaling the size and positioning information included in a character font as a function of the point size to be used to display the character and then rounding the size and positioning values to integer multiples of the utilized pixel size. Using pixel size units as the minimum distance unit produces what is called "pixel precision" since the values are accurate to the size of one pixel.

Rounding using pixel precision introduces errors into displayed images. Each of these errors may be up to ½ a pixel in size. Thus, the overall width of a character may be less accurate than desired due to the character's AW rounding. In addition, position a character's BB within the total horizontal space allocated to the character may be sub-optimal due to rounding the LSB. At small point sizes, the errors introduced by rounding using pixel precision can be significant as a percentage of the overall character width.

Minor changes in the spacing of characters found in an existing document can have significant formatting effects which are often not anticipated by the user. For example, changes in overall character width may change line and page breaks causing text to wrap in unexpected ways and/or to extend over multiple pages where previously the text did not.

It is also desirable, from a backwards compatibility perspective, that at least some of the new methods and apparatus position characters within preselected character spaces better than those already in use. In this manner, improvements in character positioning may be possible without affecting the formatting of existing documents.

In view of the above discussion, it is apparent that there is a need for improved methods of rendering and displaying images including text.

SUMMARY OF THE PRESENT INVENTION

The present invention is directed to methods and apparatus for spacing and/or positioning images, e.g., displayed text characters.

In accordance with the present invention, sub-pixel scaling accuracy, also referred to herein as sub-pixel precision, is used to improve the accuracy of various scaled image values. The use of sub-pixel precision in scaling operations offers superior character size and placement accuracy over systems which use pixel precision.

Sub-pixel scaling involves rounding scaled image values to a resolution which is finer than that provided by rounding to pixel size distance units.

In some embodiments, sub-pixel resolution is employed to round scaled image values to values which correspond to pixel sub-component boundaries. In other embodiments, sub-pixel resolution is used to allow character size and character positioning values to be rounded to any desired fraction of a pixel size distance unit. The use of sub-pixel resolution for character spacing can be important when trying to accurately represent, on a display device, how a document will appear when printed at a higher resolution then the resolution of the pixel display device, i.e., it is important when trying to implement "what you see is what you get" (WYSIWYG) applications.

Various embodiments involve the use of sub-pixel precision for determining overall character width, left side bearing, and/or character BB size values. In some implementations, sub-pixel precision is used to round horizontal character size and placement values to values which correspond to pixel sub-component size distance units. Such embodiments may be described as using pixel sub-component resolution for distance and/or character positioning values. Since there are usually three pixel sub-components per pixel, use of pixel sub-component precision can reduce rounding error by, e.g., $2/3$, as compared to systems which use pixel precision.

In order to avoid altering formatting, e.g., line and page breaks, of existing documents by applying sub-pixel precision to character spacing and position values, one embodiment of the present invention determines the overall width, e.g., the AW of characters, using pixel precision as done in known systems. However, to improve the overall appearance of the displayed text, the left side bearing point which controls a character's position within the character's overall horizontal space is determined using partial pixel precision. In this manner, the positioning of characters within a space corresponding to that used in known systems can be improved through the use of sub-pixel precision without affecting the formatting, e.g., line and page breaks, of existing documents.

Numerous additional features, embodiments, and advantages of the methods and apparatus of the present invention are set forth in the detailed description which follows.

DETAILED DESCRIPTION

As discussed above, the present invention is directed to methods and apparatus for controlling the spacing and/or positioning of images, e.g., text and/or graphics, on display devices. The methods and apparatus of the present invention are particularly well suited for use with display devices which can utilize multiple distinct sections of an output device, e.g., the R, G, B pixel sub-components of a liquid crystal display, to represent a single pixel of an image.

Various methods of the present invention use each pixel sub-component of a pixel as an independent luminous intensity source. This is in contrast to treating a set of RGB pixel sub-components which comprise a pixel as a single luminous intensity unit. This allows for a display device having three pixel sub-components per pixel element, and RGB horizontal or vertical striping, to be treated as having an effective resolution in the dimension perpendicular to the striping that is up to three (3) times greater than in the other dimension. Use of more than three pixel sub-components per pixel element can be used to provide even greater resolution in accordance with the present invention. Various apparatus of the present invention, including character rendering apparatus, take advantage of the ability to individually control the luminous intensity of pixel sub-components.

Figure 5:
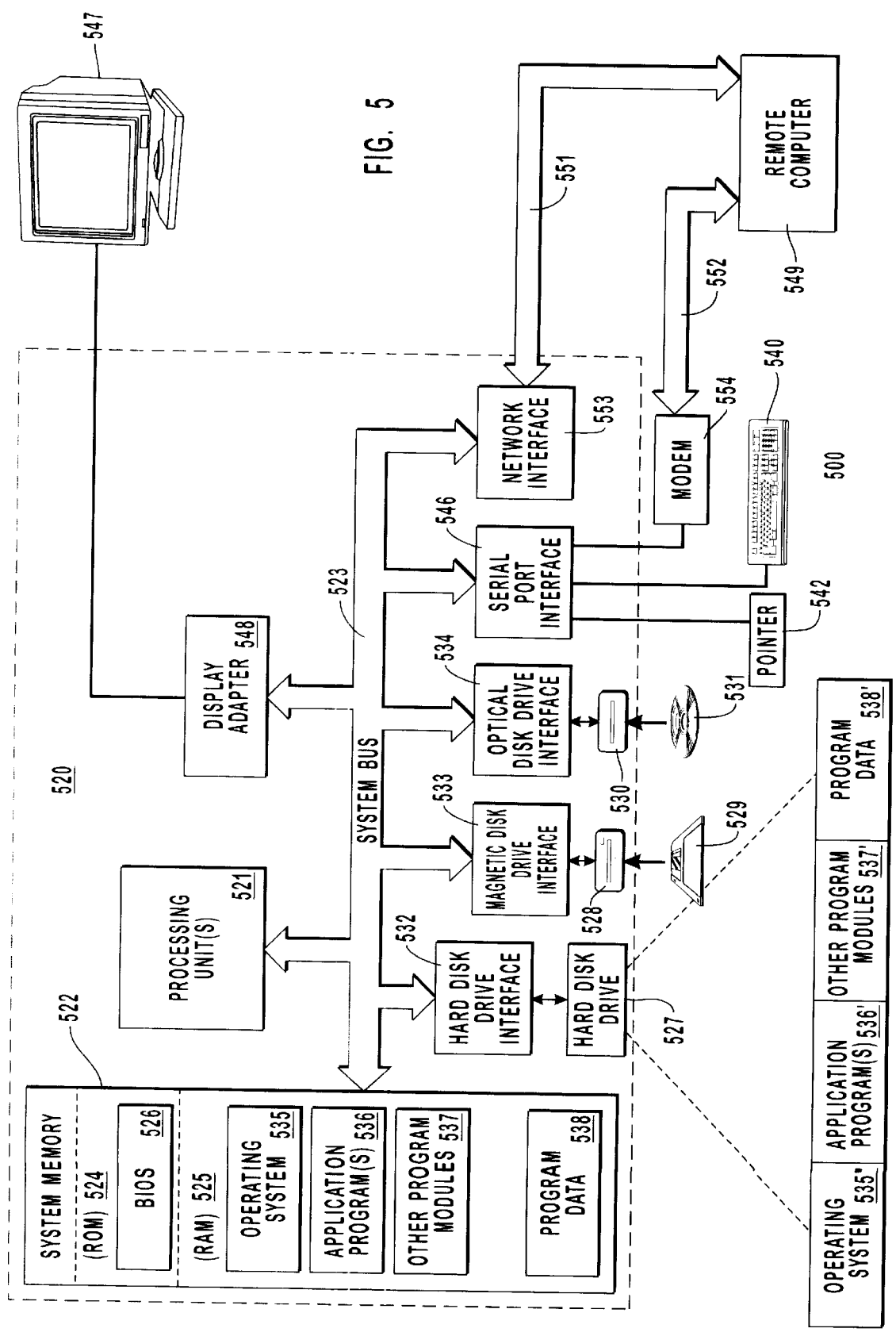
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules and/or routines, being executed by a computer device such as a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures e.g., look-up tables, etc. that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device. The personal computer 520 may include a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices cii introduced above.

A number of program modules may be stored on the hard disk 523, magnetic disk 529, (magneto) optical disk 531, ROM 524 or RAM 525, such as an operating system 535, one or more application programs 536, other program modules 537, display driver 830, and/or program data 538 for example. The RAM 525 can also be used for storing data used in rendering images for display as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a display adapter 548, for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520, although only a memory storage device 550 has been illustrated in FIG. 5. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7:
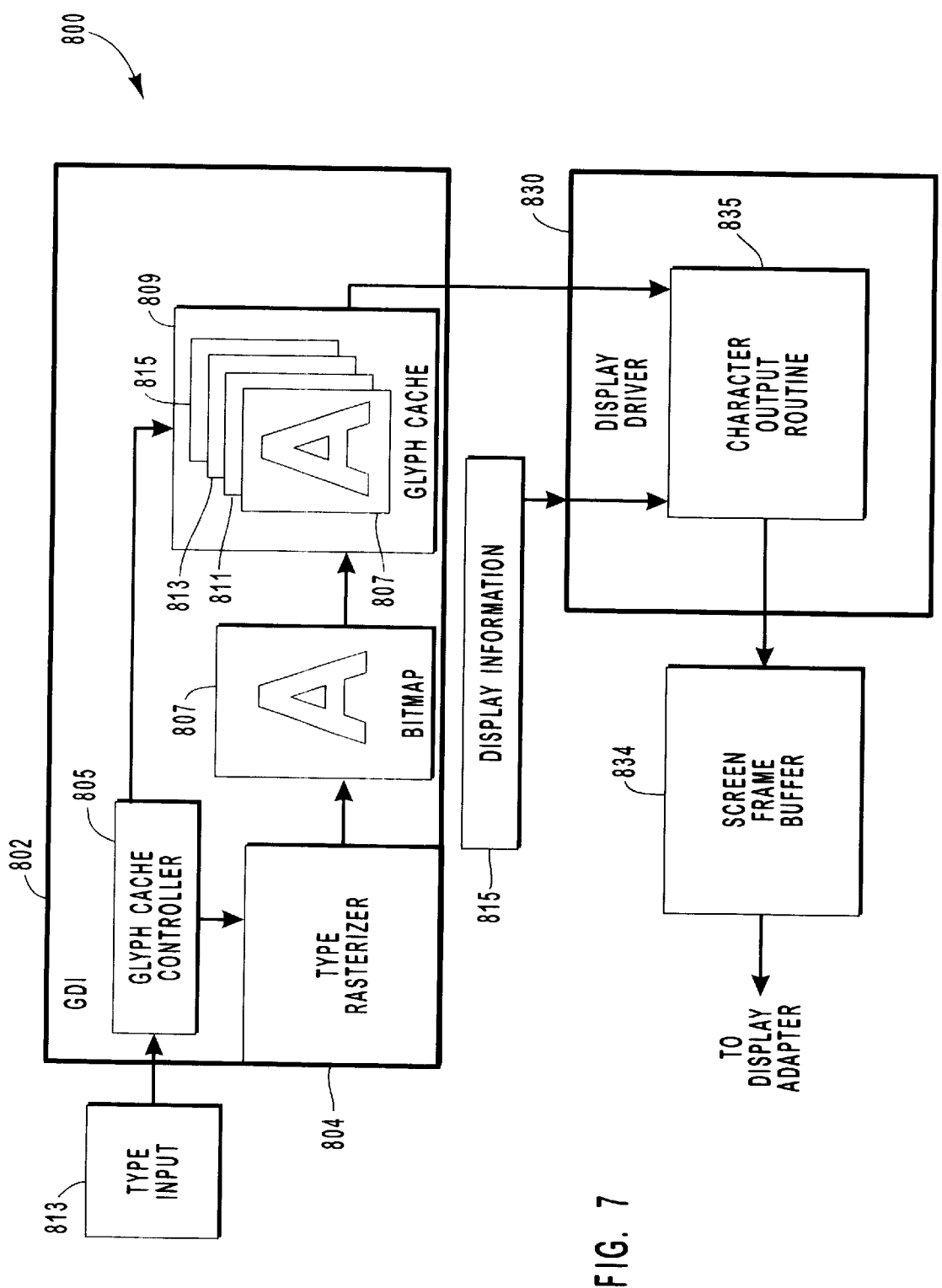
FIG. 7 illustrates an exemplary image rendering apparatus of the present invention.

FIG. 7 illustrates an image rendering apparatus 800 of the present invention. The image rendering apparatus 800 includes a graphics display interface (GDI) 802, display driver 830, and screen frame buffer 834. The GDI receives text input 813 and produces one or more character glyphs therefrom. Character glyphs include, e.g. a bitmap representation of the black body portion of a character, LSB information and/or AW information. The GDI includes a glyph cache controller 805, type rasterizer 804, and glyph cache 809. Glyphs, including bitmap character representations 807, 811, 813 are generated by the type rasterizer 804. The generated glyphs 807, 811, 815 are stored in the glyph cache 809 and output to the display driver 830 as required. The display driver 830 converts the character glyph information into the actual R, G, B pixel sub-component luminous intensity values which are loaded into the screen frame buffer 834. The operation of the various components of the image rendering apparatus 800 will be described in greater detail below with regard to FIG. 8.

Figure 8:
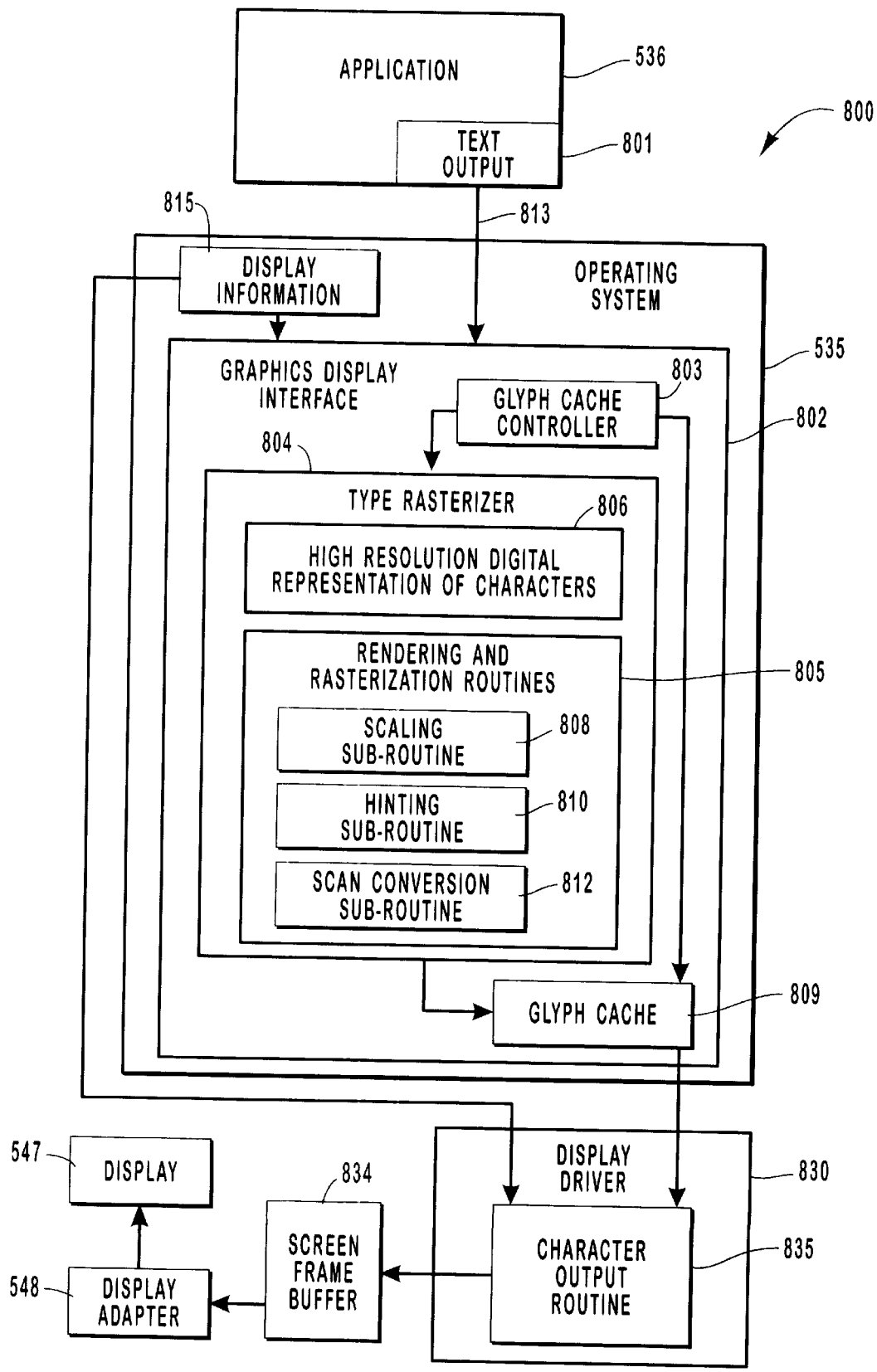
FIG. 8 illustrates an image rendering apparatus of the present invention as it relates to various other components of the computer system illustrated in FIG. 5.

FIG. 8 illustrates the components of image rendering apparatus 800 of the present invention and their relationship to operating system 535. Image rendering apparatus 800 includes a graphics display interface (GDI) 802, display driver 830 and screen frame buffer 834. The apparatus 800 includes various routines, e.g., included in the memory of the computer system of FIG. 5, used to render text images on the computer system's display 547 in accordance with the present invention.

FIG. 8 also illustrates how an application 536 may provide text 813 to the GDI 802. In addition, it illustrates how the generated contents of the screen frame buffer 834 can be supplied to the display adapter 548 and ultimately the display device 547. Supplying signals generated by the display adapter 548 processed pixel values output by the screen frame buffer 834, results in the rendered text images being displayed on the display device 547.

As illustrated in FIG. 8, the application routine 536, which may be, e.g., a word processor application, includes a text output component 801. The text output sub-component 801 is responsible for outputting text information, represented as arrow 813, to the operating system 535 for rendering on the display device 547.

The operating system 535 includes various components responsible for controlling the display of text on the display device 547. These components include display information 815 and the graphics display interface 802. As discussed above the display information 815 includes, e.g., information on scaling to be applied during rendering. It may also include information used by the display driver 830, such as gamma correction information, foreground/background color information, and/or color palette information.

The graphics display interface 802 includes circuits and/or routines for processing graphics as well as text. These include the glyph cache controller 805, the glyph cache 809 and type rasterizer 804.

The glyph cache 809 is used for storing a plurality of glyphs 807, 811, 813, 815. The stored glyphs, in accordance with the present invention, include bitmap images of, e.g., characters, LSB values and AW width values. The stored glyphs 807, 811, 813, 815 may correspond to different sized representations of the same character, representations of the same character using different type faces, or different characters. The stored glyphs 807, 811, 813, 815 are monochrome character representations with optional user color foreground/background selections being applied later by the display driver 830.

The GDI 802 receives text information 813 as input. The text information 813 includes, e.g., information identifying the character or characters to be rendered, the font to be used during rendering, and the point size at which the characters are to be rendered and information identifying the screen position at which the images are to be rendered. The text information 813 is supplied to the glyph cache controller 803. The glyph cache controller 803 determines if a character being rendered matches a character glyph already stored in the glyph cache 809. For a character to match a cached character glyph, the cached character glyph needs to match not only the character itself but also the specified point size, LSB value and character AW value. If the character to be rendered matches a character glyph which is already present in the cache 809, the glyph cache controller 803 controls the glyph cache 809 to output the matching character glyph.

When a character to be rendered does not match a character glyph in the glyph cache 809, the type rasterizer 804 is used to generate a bitmap of pixel values and character spacing information, e.g., the glyph 807, corresponding to the character to be rendered. In the exemplary embodiment each glyph generated by the rasterizer 804 is stored in the glyph cache 809 and output for further processing to the display driver 830.

The type rasterizer 804 includes character data 806 and rendering and rasterization routines 807.

The character data 806 corresponds to a font file. In one embodiment, the character data 806 includes, for each supported character, a high resolution representation of the supported character, e.g., vector graphics, lines, points and curves. The character data 806 also includes, for each supported character BB size, BB position, and character spacing information. The BB positioning information may include, e.g., an LSB value while the character spacing information may be, e.g., an AW value.

The rendering and rasterization routines 807 include a scaling sub-routine 808, a hinting sub-routine 810, and a scan conversion sub-routine 812. The scaling, hinting, and scan conversion sub-routines consider, utilize, and/or treat a screen's RGB pixel sub-components as separate luminous intensity entities which can be used to represent different portions of an image to be rendered.

Display driver 830 includes a character output routine used to process and output pixel values which represent the text to be displayed. The pixel values, e.g., R, G, B luminous pixel sub-component intensity values are output to memory locations within the screen frame buffer 834 which correspond to physical screen positions. Display driver 830 receives as its input glyphs, e.g., the glyph 807 output by the GDI 802 and display information 815.

The pixel values output by the display driver are of a form, e.g., 8 bit R, G, and B luminous intensity values, which are used by the display adapter 548 and/or display device 547.

Operations performed by each of the scaling, hinting and scan conversion sub-routines 808, 810, 812, of the present invention will be explained with reference to FIG. 9. Display driver operation will be discussed in greater detail with regard to FIG. 10.

Figure 9:
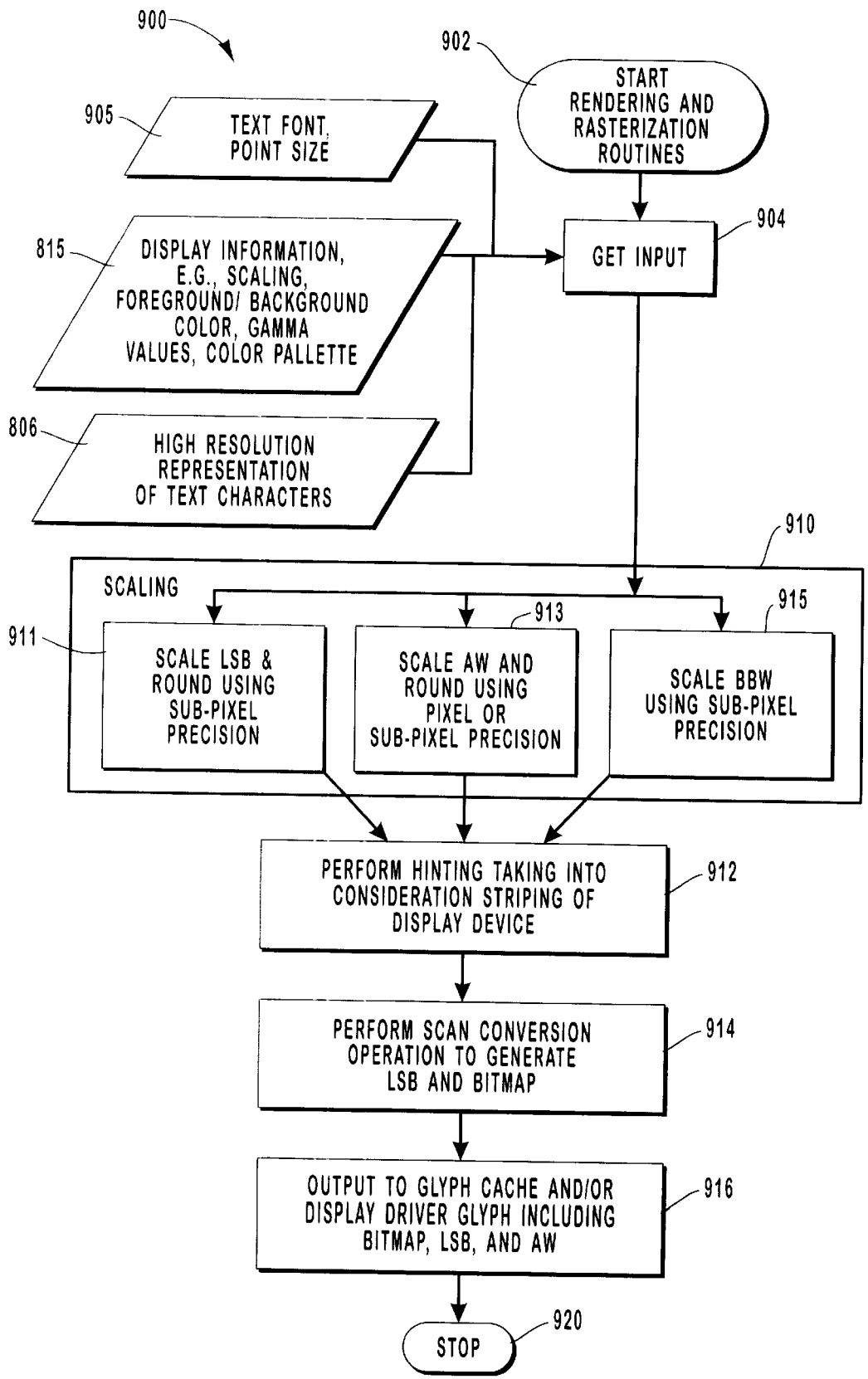
FIG. 9 illustrates processing performed in accordance with rendering and rasterizing routines of the present invention.

FIG. 9 illustrates the rendering and rasterization routines 807 used for rendering text for display in accordance with the present invention. As illustrated, the routines 807 begin in step 902 wherein the routines are executed, e.g., under control of the operating system 535, in response to the receipt of text information from the application 536. In step 904 input is received by the text rendering and rasterization routines 807. The input includes text, font, and point size information 905 obtained from the application 536. In addition, the input includes display information 815. display information 815 includes, e.g., scaling information, foreground/background color information, gamma values, pixel size information, color palette information and/or display adapter/display device pixel value format information. Display information 815 may be obtained from monitor settings stored in memory 522 by the operating system 535.

The input received in step 904 also includes character data 806 which includes a high resolution representation, e.g., a BB in the form of lines, points and/or curves, of the text characters to be displayed. Character data 806 also includes BB size, BB positioning and overall character width information, e.g., bounding box dimensions, and LSB value, and an AW value, respectively.

With the input received in step 904, operation proceeds to step 910 wherein the scaling subroutine 808 is used to perform a scaling operation on the received character BB as well as the LSB and AW values.

The scaling sub-routine 808 includes LSB scaling step 911, AW scaling step 913 and BB scaling step 915. These steps 911, 913, 915 can be performed sequentially or in parallel.

In LSB scaling step 911, the LSB for the character to be rendered is scaled according to the specified point size but, rather than round the LSB to a value corresponding to a pixel size distance unit, sub-pixel precision is maintained. That is, LSB values are permitted to have a portion which corresponds to an integer multiple of a pixel size unit and a remainder which is smaller than a pixel size unit. In some embodiments, scaled LSB values are rounded so that they correspond to an integer multiple of the horizontal size of a pixel sub-component. In embodiments where equal sized R, G and B pixel sub-components comprise each pixel element, the use of pixel sub-component precision for LSB values allows for LSB values to be rounded to, e.g., ⅓ of a pixel size unit. The use of pixel sub-component precision, in some embodiments, involves rounding scaled values so that they correspond to the nearest R, G, B pixel sub-component boundary, within the scaled image.

Using LSB values which are calculated to sub-pixel precision advantageously places a character's BB more accurately within the overall space allocated to a character than is possible when mere pixel precision is used. This provides improved character legibility and/or increases the perceived quality of the displayed text.

In AW scaling step 913, the AW value for the character to be rendered is scaled according to the specified point size. In one embodiment, it is scaled using pixel precision. Such an embodiment advantageously provides for characters which have overall widths that are integer multiples of the utilized pixel size. Such embodiments result in characters with an overall width which matches the overall width produced by current systems which use pixel precision. Accordingly, use of pixel precision has the advantage, in some cases, of producing images which will not alter the formatting of existing documents.

In other embodiments, the AW value scaling step 913 uses sub-pixel precision when generating scaled AW values. In such embodiments, overall character widths are scaled to a level of precision that is smaller than a pixel size distance unit. In the case of one particular embodiment, scaled values are rounded to pixel sub-component precision, e.g., units ⅓ that of a pixel size unit. In the one pixel sub-component embodiment, scaled AW values are rounded to correspond to the nearest R, G, B pixel sub-component boundary. In other cases, sub-pixel precision is maintained to the level of over sampling supported in the direction perpendicular to display striping.

In the black body scaling step 915, the BB of the image, e.g., the image outline, is scaled using sub-pixel precision. Accordingly, the character outline is scaled more precisely than when using pixel precision.

In accordance with the present invention, non-square scaling is performed as a function of the direction and/or number of pixel sub-components included in each pixel element. In particular, the high resolution character data 806, e.g., the line and point representation of characters to be displayed as specified by the received text and font information, is scaled in the direction perpendicular to the striping at a greater rate than in the direction of the striping. This allows subsequent image processing operations to exploit the higher degree of resolution that can be achieved by using individual pixel sub-components as independent luminous intensity sources in accordance with the present invention. In the case of vertical R, G, B stripping, this means that a character's BB is scaled in the horizontal dimension to be a multiple of the actual character size given a specified point size. Such scaling allows over sampling e.g., by a factor equal to the over-sampling rate, during the subsequent scan conversion operation. By over sampling an image, multiple image segments are allocated to each physical pixel element that will be used to display a character.

Figure 1:
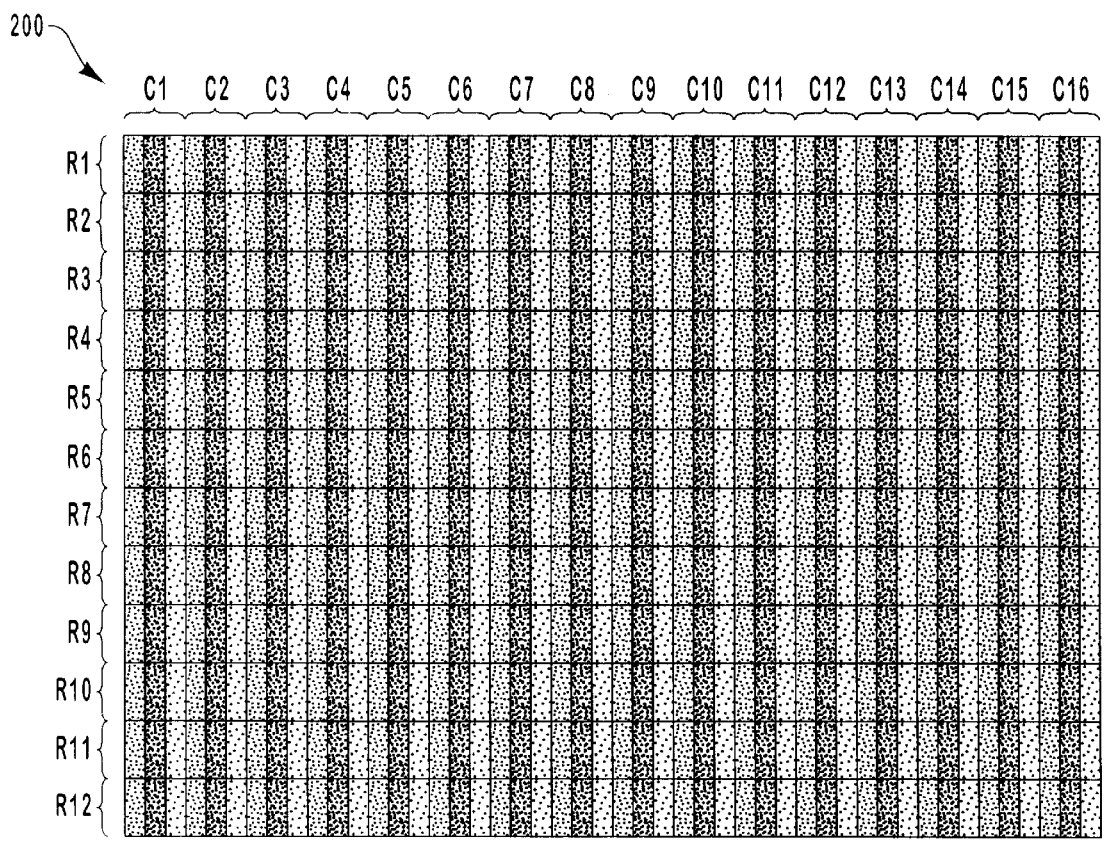
FIG. 1 illustrates a known LCD screen.
Figure 2:
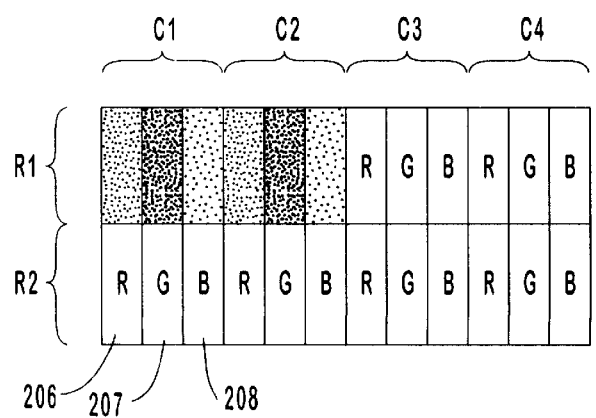
FIG. 2 illustrates a portion of the known screen illustrated in FIG. 1 in greater detail than the FIG. 1 illustration.

Thus, when data is to be displayed on displays of the type illustrated in FIG. 1, horizontal scaling is greater than vertical scaling direction.

The differences in vertical and horizontal scaling can vary depending on the display used and the subsequent scan conversion and hinting processes to be performed. Display information including scaling information obtained in step 904 is used in step 910 to determine the scaling to be performed in a given embodiment.

In most cases, the scaling of characters or images is, but need not be, performed in the direction perpendicular to the striping at a rate which allows further dividing of the red, green and blue stripes to thereby support a subsequent weighted scan conversion operation. In cases where a weighted scan conversion operation is to be applied, scaling is performed as a function of the RGB striping and the weighting used. In one embodiment with vertical striping where the red pixel component is allocated a weight of 5, the green pixel sub-component allocated a weight of 9, and the blue pixel sub-component a weight of 2, scaling is performed at a rate of 1 times in the y (vertical) direction and 16 times in the x (horizontal) direction.

Referring once again to FIG. 9, once the scaling operation is completed in step 910, operation optionally proceeds to step 912 in which the scaled image is "hinted", e.g., by executing the hinting sub-routine 810. The term grid-fitting is sometimes used to describe the hinting process. The hinting step may, and in some embodiments is, skipped.

Hinting typically involves the aligning a scaled character within a grid to be used as part of a subsequent scan conversion operation and distorting image outlines so that the image better conforms to the shape of the grid. The grid is determined as a function of the physical size of a display device's pixel elements and any weighting to be applied during the subsequent scan conversion operation.

In some embodiments, the present invention treats pixel sub-component boundaries as boundaries along which characters can and should be aligned or boundaries to which the outline of a character should be adjusted. In other embodiments, image segments which correspond to the size used in the subsequent scan conversion process, are used as the boundaries to which a character's edges can and should be aligned or boundaries to which the outline of a character should be adjusted.

The hinting process of the present invention involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or sub-pixel component boundary and aligning the bottom of the character's base along a pixel component or sub-component boundary.

Experimental results have shown that in the case of vertical striping, characters with stems aligned so that the character stem has a blue or green left edge generally tend to be more legible than characters with stems aligned to have a red left edge. Accordingly, in at least some embodiments, when hinting characters to be displayed on a screen with vertical striping, blue or green left edges for stems are favored over red left edges.

In the case of horizontal striping, characters aligned so that the bottom of the character base has a red or blue bottom edge generally tend to be more legible than characters with bases aligned to have a green bottom edge. Accordingly, when hinting characters to be displayed on a screen with horizontal striping, in at least some embodiments, red or blue bottom edges are favored over green bottom edges.

Once the hinting process is completed in step 912, operation proceeds to step 914 wherein a scan conversion operation is performed in accordance with the present invention, e.g., by executing the scan conversion sub-routine 812. In several embodiments, the scan conversion operation is a weighted scan conversion operation.

Scan conversion involves converting the scaled geometry representing a character into bitmap image values. It is normally performed on the scaled, hinted, black body portion of a character with the remaining portions of the character, e.g., the LSB and RSB portions, being set to the specified background color by the display driver 830.

In one exemplary embodiment, the remainder portion of the scaled LSB is added to the left side of the black body and thereby incorporated into the bit map character image representation generated by the scan conversion operation. In such an embodiment, the LSBs incorporated into character glyphs output by the type rasterizer 804 incorporate LSBs corresponding to an integer multiple of a pixel's horizontal size.

Figure 3:
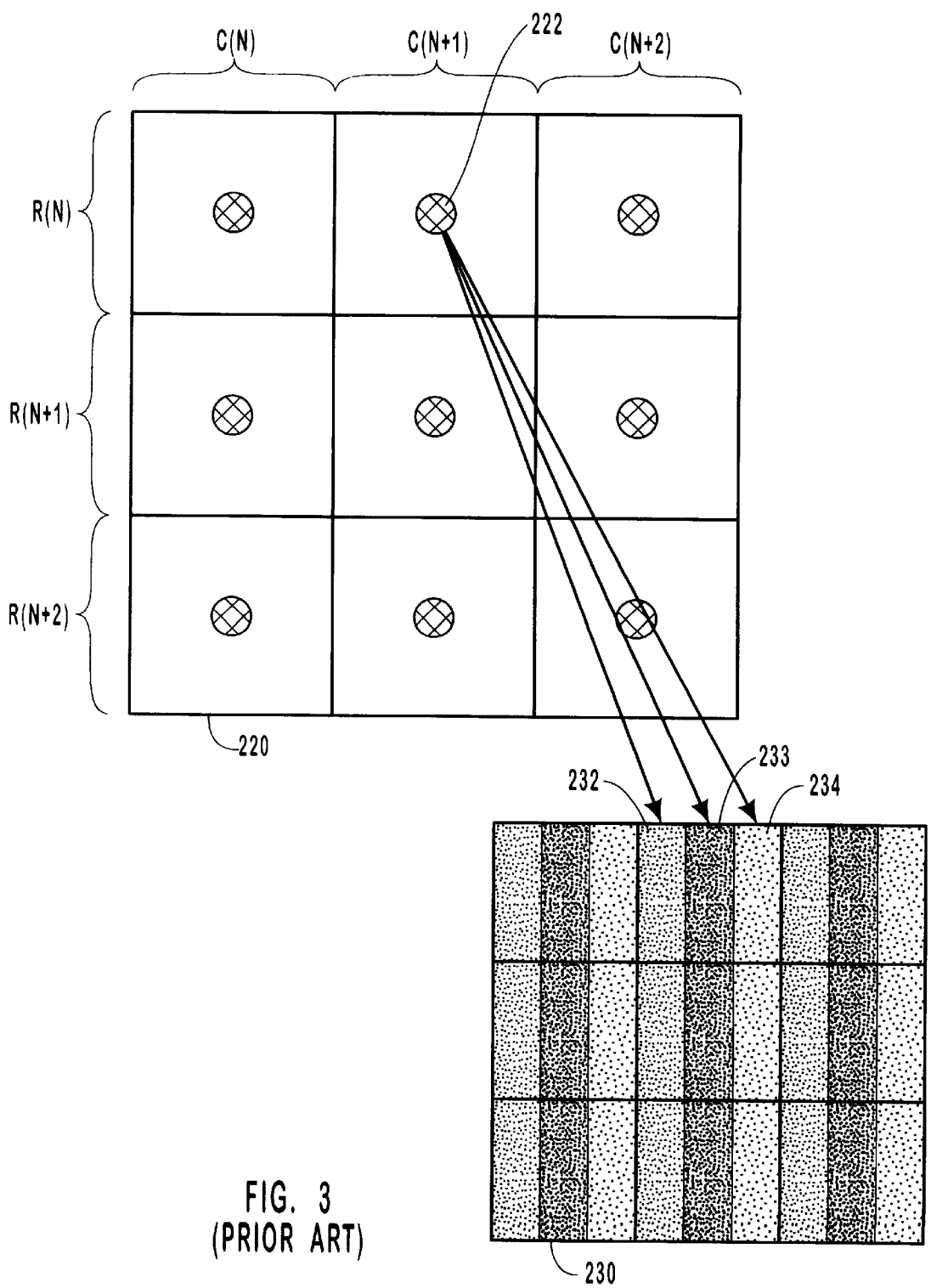
FIG. 3 illustrates an image sampling operation performed in known systems.
Figure 4:
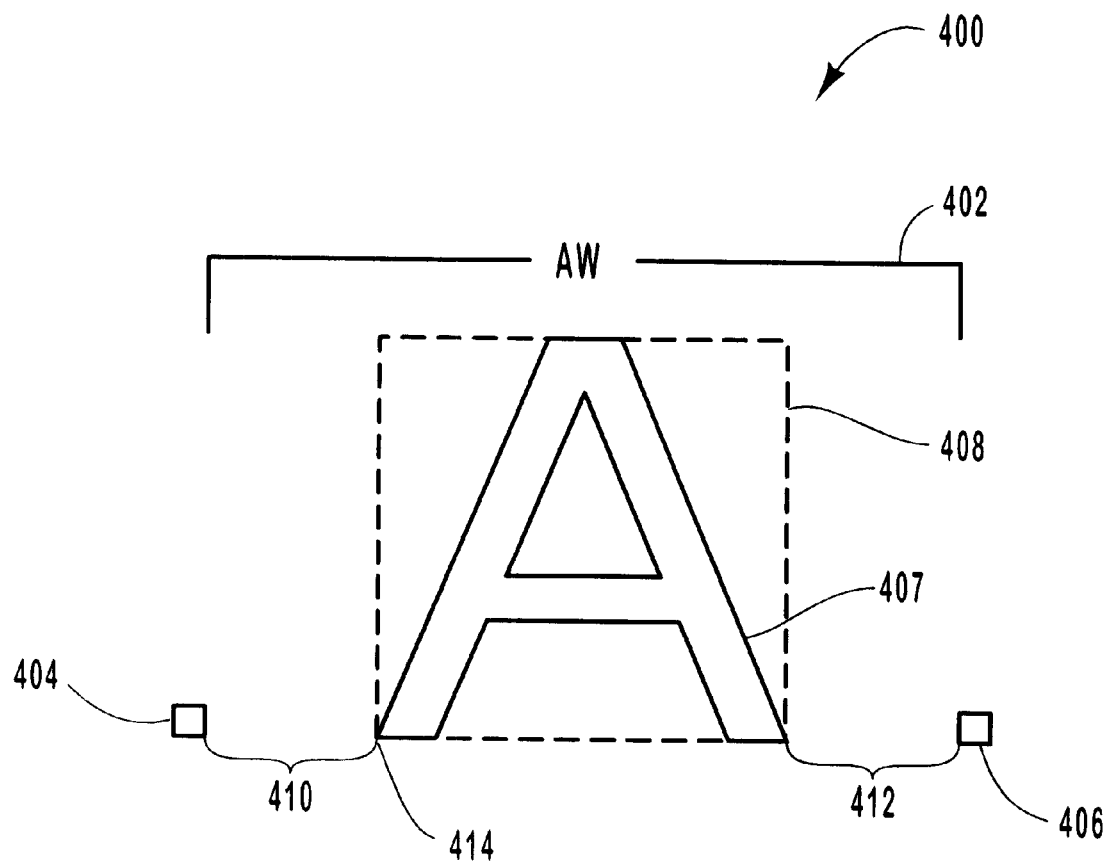
FIG. 4 illustrates a character and various spacing and placement values associated therewith.

Most conventional scan conversion operations treat pixels as individual units into which a corresponding portion of the scaled image can be mapped. Accordingly, in the case of conventional scan conversion operations, the same portion of an image, e.g., a pixel element sized portion, is used to determine the luminous intensity values to be used with each of the RGB pixel sub-components of a pixel element into which a portion of the scaled image is mapped. FIG. 3 exemplifies a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a different portion of the scaled image can be mapped. Thus, the present invention allows different portions of a scaled image to be mapped into different pixel sub-components providing for a higher degree of resolution than is possible with the known scan conversion techniques. That is, in various embodiments, different portions of the scaled image are used to independently determine the luminous intensity values to be used with each pixel sub-component.

Figure 6:
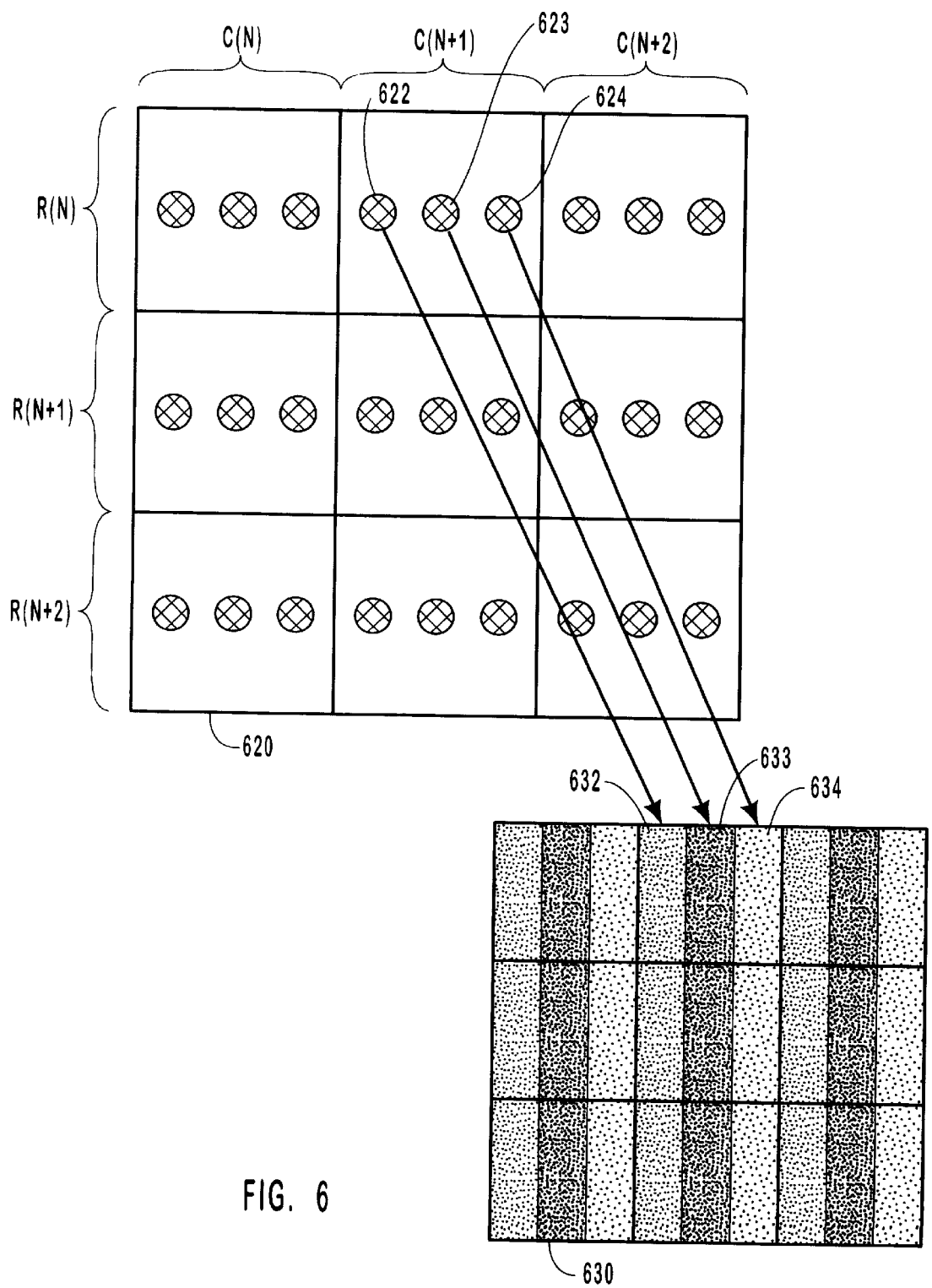
FIG. 6 illustrates image sampling performed in accordance with one exemplary embodiment of the present invention.

FIG. 6 illustrates an exemplary scan conversion operation implemented in accordance with one embodiment of the present invention. In the illustrated embodiment, different image samples 622, 623, 624 of the image represented by the grid 620 are used to generate the red, green and blue intensity values associated with corresponding portions 632, 633, 634 of the bitmap image 630 being generated. In the example illustrated by FIG. 6, image samples for red and blue are displaced −⅓ and +⅓ of a pixel width in distance from the green sample, respectively. Thus, the displacement problem encountered with the known sampling/image representation method illustrated in FIG. 3 is avoided.

As part of the scan conversion operation red, green and blue (R, G, B) luminance intensity values are generated for each pixel sub-component. These may be expressed in the form of separate, red, green and blue luminance intensity levels. In an unweighted scan conversion operation, the R, G, B intensity levels will usually be 0 or 1. In a weighted scan conversion operation more than two intensity levels are normally supported for one or more of the R, G and B pixel sub-components.

In many systems, R, G and B luminance intensity values are specified, stored and processed as three discrete quantities, having a number of bits corresponding to the number used to specify pixel sub-component luminance intensity values to the display adapter 548 and/or display device 547.

The scan conversion operation 914 produces a character glyph which includes the LSB, the R, G, B, pixel luminous values representing the characters, the BB, and the scaled AW. The character glyph is output in step 916 to the glyph cache and/or to the display driver. With the output of the glyph, operation of the rendering and rasterization routines 900 is left via stop step 920.

In some embodiments, R, G, B luminous intensity values representing a glyph are packed, e.g., compressed, as part of the rasterization process in order to reduce glyph storage requirements.

Figure 10:
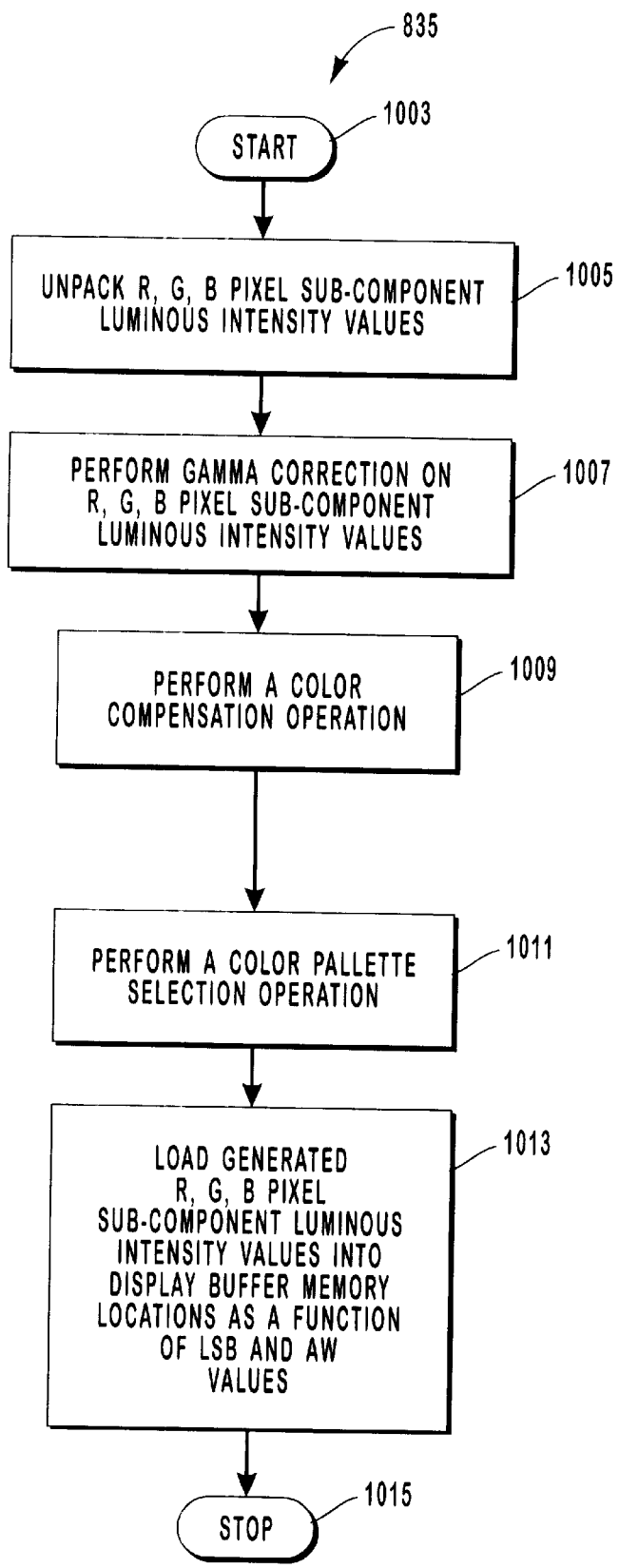
FIG. 10 illustrates a character output routine of the present invention implemented by a display driver.

FIG. 10 illustrates the character output routine 835 implemented, in some embodiments, by the display driver 830. As illustrated, the character output routine 835 starts in start step 1003 and progresses to optional unpacking step 1005. Step 1005 is utilized in embodiments where the R, G, B pixel sub-component luminous intensity values output by the rasterizer are in a packed form.

After unpacking, in step 1007, gamma correction is performed on the R, G, B luminous intensity values, e.g., to correct for various display non-linearities. Color compensation is applied next, in step 1009. Color compensation uses various filters to reduce or eliminate distracting color distortions introduced as a result of treating R,.G, and B pixel sub-components as independent luminous sources and/or to apply user foreground/background color selections to the character being displayed. Once processing in step 1009 is complete, a color palette selection operation is performed in step 1011. In step 1011, pixel colors resulting from the color compensation operation 1009 are converted into the closest colors which are supported by the display adapter 548 and/or display device 547. The R, G, B luminous intensity values generated in step 1011 are loaded into display buffer memory locations in step 1013 as a function of the LSB and AW values included in the character glyph received by the display driver 830. With the R, G, B luminous intensity values representing the character to be displayed loaded into the screen frame buffer, the routine 835 is left via stop node 1015.

In some embodiments, such as that shown in FIG. 10, the processing operations performed by the display driver are implemented as sequential processing operations. However, other embodiments of the present invention, the processing operations performed by the display driver are combined into a simple look-up table operation which outputs processed R, G, B luminous intensity values in response to input R, G, B luminous intensity values or packed pixel values.

Figure 11:
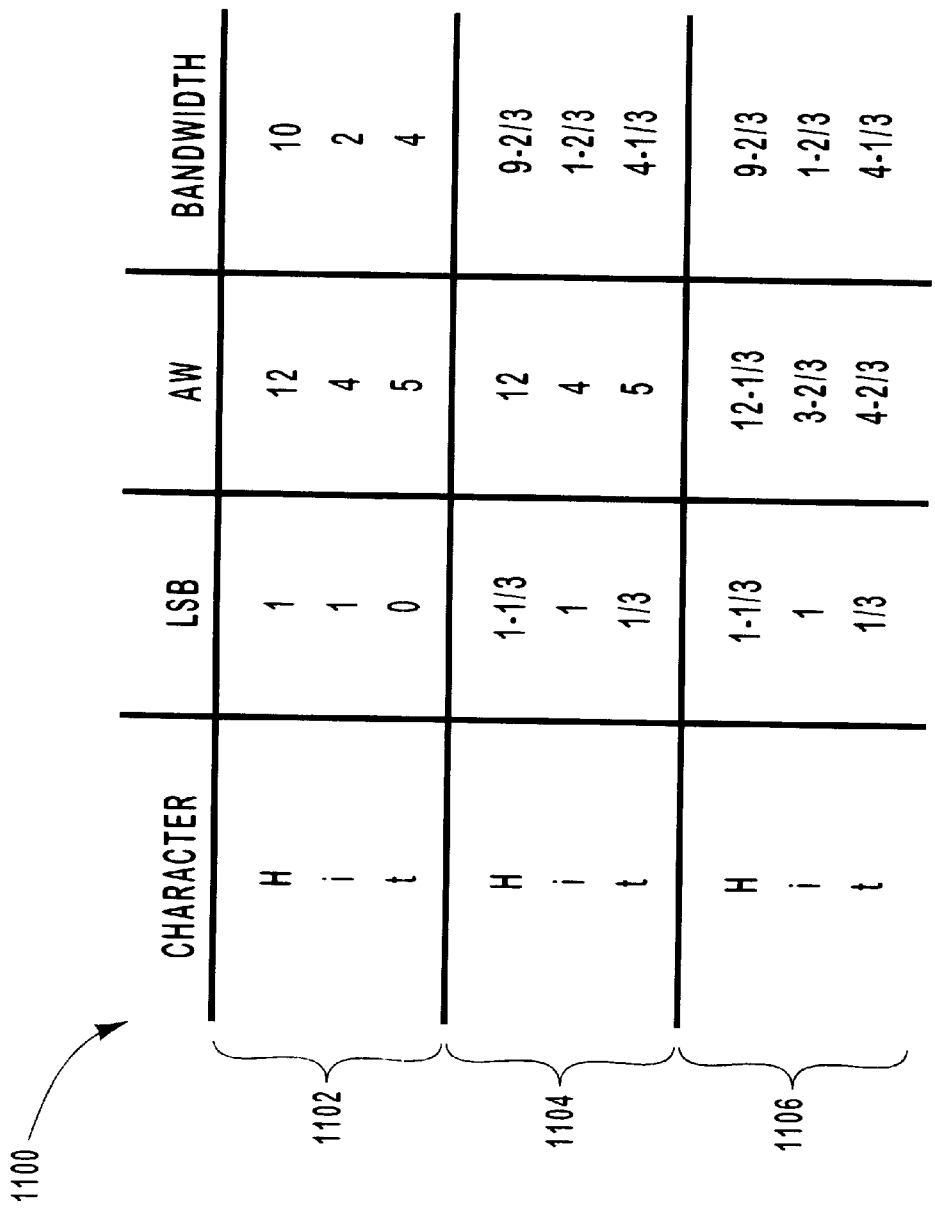
FIG. 11 is a chart of LSB, AW, and BE width values that can be used when displaying the characters H, i, and t.

FIG. 11 is a chart illustrating LSB, AW and BB horizontal values generated by scaling character fonts for each of the three characters (H, i, t) using different types of precision. The values specified in FIG. 11 are horizontal pixel size units. The first section 1102 of FIG. 11 illustrates the LSB, AW and BB values for each of the letters H, i and t when scaled using pixel precision as known in the art. Note that each of the values in section 1102 are rounded to integer values producing LSB, AW and BB values which correspond to integer multiples of pixel size units. This aligns each of the LSB, AW and BB values with pixel boundaries assuming that character LSBPs start at a pixel boundary as usually occurs in known systems.

The second section 1104 of FIG. 11, illustrates the LSB, AW and BB values for each of the letters H, i and t when scaled, in accordance with the present invention, using pixel precision for the AW value and sub-pixel for the LSB and BB values. Note how, in section 1104, the BB values and many of the LSB values include fractional pixel components which permit more accurate character positioning and black body widths than is achieved using pixel precision. In this particular exemplary embodiment, LSB and BB values are rounded to values ⅓ the width of a pixel. In cases where R. G, and B pixel sub-components which are ⅓ as wide as a pixel are used, this results in LSB and BB values which are aligned with pixel sub-component boundaries. Since AW values are rounded using pixel precision, they are the same as the values 1102 used in known systems. Accordingly, substituting the characters generated using the values in section 1104, for the same characters generated using the values in section 1102, will not affect page or line breaks but will improve the positioning and black body widths of characters.

The third section 1106 of FIG. 11, illustrates the LSB, AW and BB values for each of the letters H, i and t when scaled, in accordance with the present invention, using sub-pixel precision for the three values. Since sub-pixel precision is used for the AW value, the LSBP of a character may be positioned anywhere within a pixel. In cases where pixel sub-component precision is used, alignment of values will coincide with pixel sub-component boundaries assuming that the starting point for rending characters coincides with a pixel sub-component boundary. Note how the overall width of characters, specified by the AW values, differ in section 1106 from the AW values used in sections 1102 and 1104. That is, in section 1106, AW values include fractional pixel values.

Figure 12:
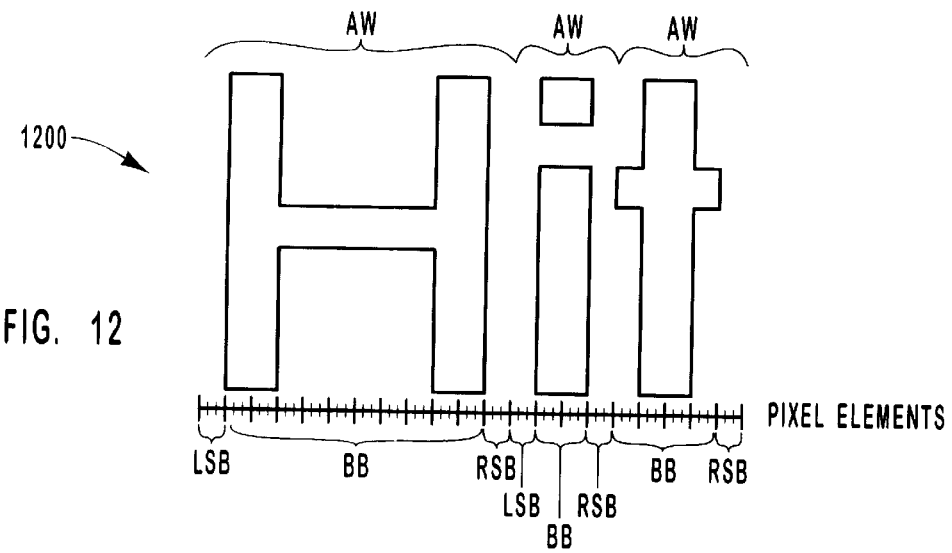
FIGS. 12–14 illustrate the display of characters using the LSB, AW and BB width values included in the FIG. 11 chart.
Figure 13:
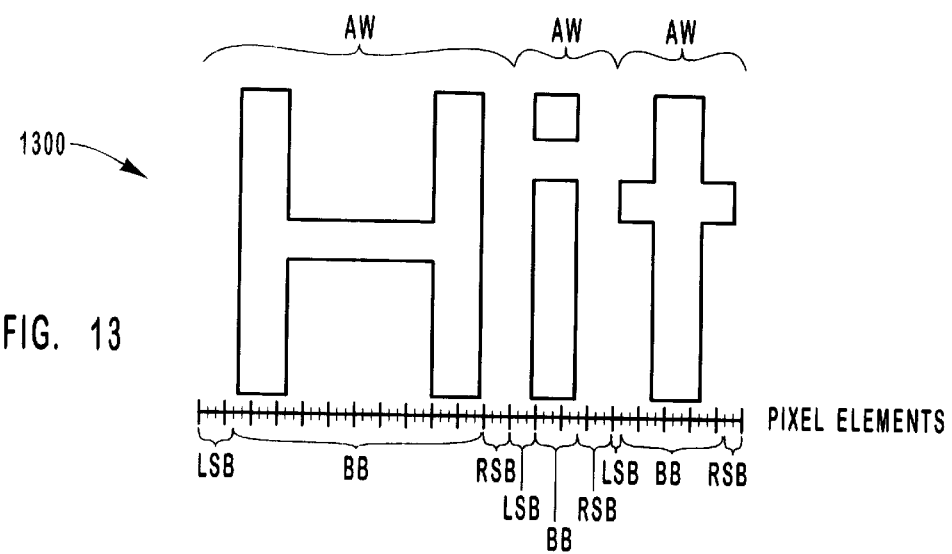

FIG. 12 illustrates text 1200 displayed on the display device 547 using the pixel precision values illustrated in section 1102 of FIG. 11. In the FIG. 12 illustration, it is apparent how character starting positions, e.g., LSPBs, and BB position, are aligned to pixel boundaries as the result of using pixel precision in determining AW, LSB and BB width values. In FIGS. 12–13, the horizontal space is divided according to the width of the pixel elements which make up the display 547. Small vertical lines mark the position of pixel sub-component boundaries while larger vertical lines mark pixel boundaries.

Figure 14:
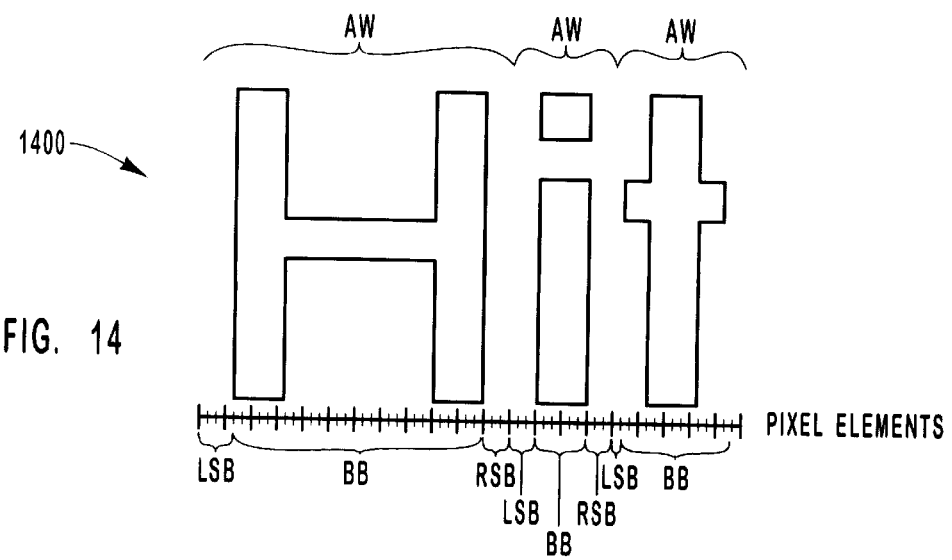

Scaled representations of the text illustrated in FIGS. 12–14 would appear similar. However, the horizontal scale would be a function of the scaling applied. In a scaled representation each large vertical scale line on the horizontal scale would mark a pixel size unit, e.g., the portion of the scaled unit which corresponds to a pixel, while the smaller vertical marks would indicate pixel sub-component widths in the case of horizontal scaling by a factor of 3. In cases where scaling by factors other than 3 are used, each pixel size unit of a scaled image would be divided into the number of segments used to represent a pixel size unit, e.g., 16, in the case of horizontal scaling of a factor of 16. In the case of horizontal scaling by a factor of 16, and allocation of 5 pixel segments to the red pixel sub-component, 9 to the blue pixel sub-component, and 2 to the blue pixel sub-component, pixel sub-component boundaries would occur within a scaled image between pixel segments 4 and 5, pixel segments 13 and 14 and at the end of pixel segment 15, assuming pixel segment numbering from 0–15 and R, G, B pixel sub-components of uniform width.

FIG. 13 illustrates text 1300, displayed on the display device 547, using the pixel precision AW values and LSB and BB width values illustrated in section 1104 of FIG. 11. The use of sub-pixel precision for LSB values and BB width values improves character BB positioning while maintaining the same overall character advanced widths used in FIG. 12. The use of pixel sub-component accuracy for LSB and BB width values in FIG. 13 results in the BB being positioned along pixel sub-component boundaries.

FIG. 14 illustrates text 1400 displayed on the display 547 using the sub-pixel precision AW, LSB and BB width values illustrated in section 1106 of FIG. 11. The use of sub-pixel precision for AW, LSB values and BB width values improves the accuracy of character AW, character BB positioning, and character BB width as compared to embodiments which use pixel precision. As a result of using sub-pixel precision for character AW values, character advanced widths in FIG. 14 differ from those used in FIG. 12. The use of pixel sub-component accuracy for AW, LSB and BB width values in FIG. 14 results in characters LSBPs and BBs being positioned along pixel sub-component boundaries assuming that the LSBP of the first character is positioned at a pixel sub-component boundary.

The above discussion has focused largely on embodiments which use vertical R. G, B striping. In cases where horizontal as opposed to vertical R, G, B striping is used, sub-pixel precision may be, and in various embodiments are used, in accordance with the present invention, for determining vertical character size and/or spacing values.

While various features of the present invention, e.g., the use of sub-pixel precision, have been described in the context of adjusting left side bearing values, they may and in some embodiments are, used to adjust other side bearing values, e.g., top side bearing values, that are used in some font implementations.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. A method of processing character image data used to display characters at a specified type size on a portion of a display divice, the portion of the display device having pixel elements, each pixel element of the display device corresponding to a scaled image portion one pixel size unit in width, the character image data including a plurality of character advanced width values and side bearing values, the method comprising the steps of:

scaling the character advance width values as a function of the specified type size to produce scaled character advance width values which are integral multiples of said pixel size unit, the scaled character advance width values having pixel precision; and scaling the side bearing values as a function of the specified type size to produce scaled side bearing values at least some of which include a fractional pixel size unit component in addition to an integer pixel size unit component, the scaled side bearing values having sub-pixel precision.

2. The method of claim 1, wherein the step of scaling character width values includes the step of rounding scaled character advance width values to values which are integral multiples of said pixel size unit.

3. The method of claim 1, wherein the scaled side bearing values include left side bearing values, and wherein the step of scaling the left side bearing values includes the step of rounding the left side bearing values to values which are integer multiples of said pixel unit size divided by the number of segments allocated to each pixel unit sized portion of a scaled image during a subsequent scan conversion operation.

4. The method of claim 3, further comprising the step of:

performing a scan conversion operation on the scaled left side bearing values, the scan conversion operation treating each pixel unit sized portion of the scaled left side bearing values as N different scaled image segments, wherein N is a positive integer greater than 1.

5. The method of claim 4, wherein N is 16.

6. The method of claim 4, wherein N is a multiple of 3.

7. The method of claim 4, further comprising the step of displaying character images on the display device as a function of the scaled advance width values and the scaled left side bearing values.

8. The method of claim 1, wherein the character image data further includes, character black bodies, the method further comprising the steps of:

scaling the character black bodies as a function of the specified type size to produce scaled black bodies having scaled black body widths at least some of which are non-integer multiples of said pixel size unit, the scaled black body widths being specified using sub-pixel precision.

9. The method of claim 8, wherein the scaled side bearing values include left side bearing values, the method further comprising the step of:

displaying a plurality of text characters on the display using the scaled left side bearing values and the scaled black bodies.

10. The method of claim 1, wherein each pixel of the display includes a plurality of pixel sub-components having widths which correspond to scaled image portions widths that are smaller than said pixel size unit, the step of scaling the side bearing values including the step of scaling the left side bearing values to scaled values corresponding to distances between pixel sub-component boundaries.

11. The method of claim 1, wherein each pixel of the display includes a plurality of equal sized pixel sub-components having a width corresponding to a scaled image portion having a scaled pixel sub-component width that is a fraction of said pixel size unit, the step of scaling the side bearing values including the step of scaling left side bearing values to be an integral multiple of the scaled pixel sub-component width.

12. The method of claim 5, wherein the scaled pixel sub-component width is approximately ⅓ of said pixel size unit.

13. The method of claim 8, wherein each of said pixel elements includes a plurality of pixel sub-components having widths which correspond to a scaled image portion that is smaller than said pixel size unit, the step of scaling the black bodies including the step of scaling black body widths to correspond to distances between pixel sub-component boundaries.

14. The method of claim 8, wherein each pixel of the display includes a plurality of equal sized pixel sub-components having a width that corresponds to a scaled image portion having a scaled pixel sub-component width that is a fraction of said pixel size unit, the step of scaling the left side bearing values including the step of scaling the left side bearing values to be an integral multiple of the pixel sub-component width.

15. The method of claim 14, wherein the width of a pixel sub-component is ⅓ of said pixel size unit.

16. The method of claim 14, further comprising the step of displaying a plurality of text characters on the display using the scaled left side bearing values and the scaled black bodies.

17. A method of processing character image data used to display characters at a specified type size on a portion of a display device, the portion of the display device having pixel elements, each pixel element of the display device corresponding to a scaled image portion one pixel size unit in width, each pixel element including a plurality of pixel sub-components, each pixel sub-component corresponding to a scaled image portion a scaled pixel sub-component unit size in width, the scaled pixel sub-component unit size being smaller than said pixel unit size, the character image data including a plurality of character advanced width values and side bearing values, the method comprising the steps of:

scaling the character advance width values as a function of the specified type size to correspond to an integer multiple of the scaled pixel sub-component unit size, at least some of the character advance values being a non-integer multiple of the pixel unit size; and scaling the side bearing values, as a function of the specified type size, to correspond to integer multiples of the pixel sub-component unit size, at least some of the scaled side bearing values being non-integer multiples of the pixel unit size.

18. The method of claim 17, wherein the character image data further includes character black bodies, the method further comprising the steps of:

scaling the character black bodies as a function of the specified type size to produce scaled black bodies having widths which are integer multiples of the pixel sub-component width, at least some of the scaled black body widths being non-integer multiples of the width of a pixel.

19. The method of claim 18, wherein the width of a pixel sub-component is ⅓ the width of a pixel.

20. The method of claim 19, wherein the specified type size is a point size.

21. The method of claim 18, further comprising the step of displaying a plurality of text characters on the display device using the scaled advance widths, the scaled side bearing values, and the scaled black bodies.

22. A method of processing character image data used to display characters at a specified type size on a portion of a display device, the portion of the display device having pixel elements, each pixel element of the display device corresponding to a scaled image portion one pixel size unit in width, each pixel element including a red, a green and a blue pixel sub-component, the red pixel sub-component corresponding to a scaled image portion a scaled red pixel sub-component unit size in width, the green pixel sub-component corresponding to a scaled image portion a scaled green pixel sub-component unit size in width, the blue pixel sub-component corresponding to a scaled image portion a scaled blue pixel sub-component unit size in width, the character image data including a plurality of character advanced width values, left side bearing values, and character black bodies, each black body having a black body width, the method comprising the steps of:

scaling the character advance width values using sub-pixel precision so that the character advance widths correspond to distances equal to the sum of zero or more, red, green and blue scaled pixel sub-component unit sizes; and scaling the left side bearing values, using sub-pixel precision so that the left side bearings correspond to distances equal to the sum of zero or more, red, green and blue scaled pixel sub-component unit sizes; and scaling the widths of character black bodies, using sub-pixel precision so that the character black body widths correspond to distances that equal the sum of zero or more, red, green and blue scaled pixel sub-component unit sizes.

23. The method of claim 22, further comprising the step of displaying character images generated using the scaled advanced widths, scaled left side bearing values and scaled black body width values so that black bodies of displayed characters are aligned with pixel sub-component boundaries.

24. A method of scaling image data including side bearing values and advanced width values, the method comprising the steps of:

Scaling the advanced width values using pixel precision to generate scaled advanced width values;

Scaling the left side bearing values using sub-pixel precision to produce scaled left side bearing values;

Scaling black body width values using sub-pixel precision to generate scaled black body widths wherein the image data includes character black bodies having black body widths;

Scaling is performed as a function of a specified text size; and

Using the scaled advanced widths, scaled left side bearing values and scaled black body widths values to display a plurality of text characters.

25. A method of scaling image data to be displayed on a display device including a plurality of pixel elements, each pixel element including a plurality of pixel sub-components, the pixel sub-components being separated by pixel sub-component boundaries, the image data including side bearing values and advanced width values, the method comprising the steps of:

scaling the advanced width values using sub-pixel precision to generate scaled advanced width values having distances corresponding to distances between pixel sub-component boundaries; and scaling the side bearing values using sub-pixel precision to produce scaled left side bearing values corresponding to distances between pixel sub-component boundaries.

26. The method of claim 25, wherein the image data further includes black bodies, each black body having a black body width, the method further comprising the step of:

scaling black body widths using sub-pixel precision to produce scaled black body widths corresponding to distances between pixel sub-component boundaries.

27. The method of claim 26, further comprising the step of:

displaying character images using the scaled advanced width, scaled side bearing values and scaled black body widths, the displayed character images having at least some black bodies to start as pixel sub-component boundaries which occur within a pixel element.

28. A computer readable medium, comprising:

computer executable instructions for processing character image data used to display characters at a specified type size on a portion of a display device, the portion of the display device having pixel elements, each pixel element of the display device corresponding to a scaled image portion one pixel size unit in width, the character image data including a plurality of character advanced width values and left side bearing values, the processing including the steps of:

scaling the character advance width values as a function of the specified type size to produce scaled character advance width values which are integral multiples of said pixel size unit, the scaled character advance width values having pixel precision; and scaling the left side bearing values as a function of the specified type size to produce scaled left side bearing values at least some of which include a fractional pixel size unit component in addition to an integer pixel size unit component, the scaled left side bearing values having sub-pixel precision.

29. A computer readable medium, comprising:

computer executable instructions for processing character image data used to display characters at a specified type size on a portion of a display device, the portion of the display device having pixel elements, each pixel element of the display device corresponding to a scaled image portion one pixel size unit in width, each pixel element including a plurality of pixel sub-components, each pixel sub-component corresponding to a scaled image portion a scaled pixel sub-component unit size in width, the scaled pixel sub-component unit size being smaller than said pixel unit size, the character image data including a plurality of character advanced width values and left side bearing values, the processing including the steps of:

scaling the character advance width values as a function of the specified type size to correspond to an integer multiple of the scaled pixel sub-component unit size, at least some of the character advance values being a non-integer multiple of the pixel unit size; and scaling the left side bearing values, as a function of the specified type size, to correspond to integer multiples of the pixel sub-component unit size, at least some of the scaled left side bearing values being non-integer multiples of the pixel unit size.

30. An image processing apparatus, comprising:

means for scaling advanced width values using pixel precision to generate scaled advanced width values;

means for scaling side bearing values using sub-pixel precision to produce scaled side bearing values; and means for generating a display signal as a function of the scaled advanced width values and scaled side bearing values.

31. The apparatus of claim 30, further comprising:

means for scaling black body widths using sub-pixel precision to produce scaled black body widths.

32. The apparatus of claim 31, further comprising:

means for displaying character images generated using the scaled advance width values, scaled side bearing values, and scaled black body widths.

33. An apparatus, comprising:

a display device including a plurality of pixel elements, each pixel element including a plurality of pixel sub-components, the pixel sub-components being separated by pixel sub-component boundaries, means for scaling advanced width values using sub-pixel precision to generate scaled advanced width values having distances corresponding to distances between pixel sub-component boundaries;

means for scaling left side bearing values using sub-pixel precision to produce scaled left side bearing values corresponding to distances between pixel sub-component boundaries; and means for generating images on the display as a function of the scaled advanced width values and scaled left side bearing values.

34. The apparatus of claim 33, further comprising:

means for scaling black body widths using sub-pixel precision to produce scaled black body widths; and wherein the means for generating images includes means for using the scaled black body widths to display characters at least some of which are aligned with pixel sub-component boundaries.

\* \* \* \* \*

UNITED STATES PATENT AND TRADEMARK OFFICE
CERTIFICATE OF CORRECTION

PATENT NO. : 6,236,390 B1
DATED : May 22, 2001
INVENTOR(S) : Gregory C. Hitchcock It is certified that error appears in the above-identified patent and that said Letters Patent is hereby corrected as shown below:

Column 2,
Line 60, change "TinesNewRoman" to -- TimesNewRoman --

Column 5,
Line 26, change "BE" to -- BB --

Column 6,
Line 54, after "devices" delete [cii]

Column 9,
Line 39, change "display" to -- Display --

Column 13,
Line 13, after "R," delete [.]

Signed and Sealed this

Sixteenth Day of April, 2002

Attest:

JAMES E. ROGAN
Attesting Officer     *Director of the United States Patent and Trademark Office*